(12) United States Patent
Olson (10) Patent No.: US 6,381,036 B1
(45) Date of Patent: Apr. 30, 2002

(54) METHOD FOR DETERMINING PRINTER COLORANT LEVELS

(75) Inventor: Thor A. Olson, Minnetonka, MN (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 09/327,386

(22) Filed: Jun. 7, 1999

(51) Int. Cl.[7] ............................................. G06F 15/00
(52) U.S. Cl. .................. 358/1.9; 358/504; 358/520; 347/19; 347/116; 347/234
(58) Field of Search .................. 358/1.9, 1.15, 358/504–515, 518, 520–530; 347/19, 24, 43, 115, 116, 171, 172, 178, 232, 234

(56) References Cited

U.S. PATENT DOCUMENTS

| | | |
|---|---|---|
| 5,212,546 A | 5/1993 | Arazi et al. |
| 5,227,815 A * | 7/1993 | Dastin et al. ............... 347/116 |
| 5,285,297 A | 2/1994 | Rose et al. |
| 5,416,890 A | 5/1995 | Beretta |
| 5,611,028 A | 3/1997 | Shibasaki et al. |
| 5,760,913 A | 6/1998 | Falk |
| 5,877,787 A | 3/1999 | Edge |
| 5,991,511 A | 11/1999 | Granger ........................ 358/1.9 |
| 6,164,749 A | 12/2000 | Williams ....................... 347/19 |

FOREIGN PATENT DOCUMENTS

| | | |
|---|---|---|
| EP | 0 794 657 | 9/1997 |
| WO | 99/20036 | 4/1999 |

* cited by examiner

*Primary Examiner*—Mark Wallerson
(74) *Attorney, Agent, or Firm*—Barry R. Lipsitz (57) ABSTRACT

A method is provided for determining colorant levels required by a printer to match a target color. A set of candidate colors is generated on a computer and printed on the printer. Color neighbors in the candidate color sets are calculated based on the colorants of the particular printer being used, but are presented to the user according to their human-natural organization by hue, lightness and saturation. One or more further sets of candidate colors are generated on the computer in response to user input indicative of a correlation between a color in a most recent printed set of candidate colors and the target color. The user then chooses a further set of candidate colors to be printed. The steps of generating and printing further sets of candidate colors are repeated, if necessary, until a selected color in the most recent printed set of candidate colors acceptably matches the target color. Information indicative of the colorant levels required by the printer to print the selected color is recorded for subsequent use in printing that color.

21 Claims, 6 Drawing Sheets

METHOD FOR DETERMINING PRINTER COLORANT LEVELS

BACKGROUND OF THE INVENTION

The present invention relates to computer color printing systems, and more particularly to an iterative process for determining printer colorant levels using color patches displayed on a computer monitor or the like.

Page layouts to be printed will, in addition to the common components of text and images, often contain graphic elements that are to be printed with a specific color. On large printing presses, these "spot" colors are printed using additional individual plates, each using an ink that makes the specific color desired.

On smaller printers, or in proofing, the spot colors must be simulated using a combination of the colorants utilized by the printer. These are usually the CMYK "process" inks, i.e., cyan, magenta, yellow, and black. While certain standard color tables exist for the simulation of some industry colors using standard ink sets, there is a general problem of finding the correct combination of colorant amounts for a given printer in order to match a particular spot color. There is a further problem of finding the colorant amounts necessary to match other target colors beyond those of spot color inks, such as colors of textiles and other colored objects.

A graphic artist or printer operator currently either accepts an approximate color match, based on simplistic or inappropriate color models for the printer, or uses a time consuming and inefficient trial and error process to find a visual match to a desired spot color. It would be advantageous to provide a method for improving the trial and error process into an efficient, directed search through the color space of a desired printer in order to find the colorant amounts required to simulate a spot color ink or to match a desired target color.

The present invention provides an iterative method for determining printer colorant levels having the aforementioned and other advantages.

SUMMARY OF THE INVENTION

In accordance with the present invention, a method is provided for determining colorant levels required by a printer to match a target color. A set of candidate colors is generated on a computer and printed on the printer. One or more further sets of candidate colors are then generated on the computer in response to user input indicative of a correlation between a color in a most recent printed set of candidate colors and the target color. The user then chooses a further set of candidate colors to be printed. The steps of generating and printing further sets of candidate colors are repeated, if necessary, until a selected color in the most recent printed set of candidate colors acceptably matches the target color. Information indicative of the colorant levels required by the printer to print the selected color is recorded (e.g., printed and/or stored in memory) for subsequent use by the printer.

In an illustrated embodiment, the sets of candidate colors comprise a center color spot surrounded by a plurality of similarly colored (i.e., related, but non-identical) color spots. A particular color can be provided for the center color spot in response to user input. In particular, the colored spot from the most recent printed set of candidate colors that a user determines best matches the target color can be provided as the next center spot.

The initial set of candidate colors can be, for example, generated from an initial guess for the target color selected from a palette of colors presented to a user by the computer. In an alternate embodiment, the candidate colors are generated from an instrument reading of the target color. For example, a densitometer can be provided to measure the target color, and the output of the densitometer can be coupled to the computer for reading in the target color readings via, e.g., a serial data port or the like. In yet another embodiment, a user is provided with color spacing and colorant level information pertaining to a previously obtained set of candidate colors, and the user enters this information into the computer for use in generating an initial set of candidate colors when commencing a new target color matching process.

An option can be provided to enable the user to adjust a color spacing between individual colors in the set(s) of candidate colors. The sets of candidate colors can each comprise a plurality of color neighbors related by one or any combination of hue, lightness and saturation, and can be presented to the user on a display (e.g., video monitor) associated with the computer.

In an illustrated embodiment, the computer monitor on which the candidate colors are displayed uses an RGB color space, whereas the colors are printed on the printer using a CMYK color space. Thus, in accordance with the invention, the CMYK color space is mapped to the RGB color space. The RGB colors are then encoded for display on the monitor in accordance with the mapping. The mapping step can include an additional parameter T associated with the RGB colors and indicative of a total ink level of the CMYK colors. The use of the T parameter facilitates a unique mapping from CMYK to RGB.

In a preferred embodiment, a plurality of candidate color sets are shown at one time on the monitor. The different sets of the plurality are related by one of lightness and saturation. A user is permitted to choose between the lightness and saturation relationships. Moreover, the user can iteratively select color patches from successively computed and displayed candidate color sets prior to printing a desired set of candidate colors on the printer.

DETAILED DESCRIPTION OF THE INVENTION

The present invention helps a user identify the printer codes (e.g., CMYK for cyan, magenta, yellow, black) for a color laser printer or the like, in order to match a printed color to a target color. It accomplishes this through a user interface that presents a color, along with its "color neighbors" that are nearby in color space. The user identifies the neighboring color that makes the best color match to the target color. After identifying the best choice from the neighbor colors, a new display of color choices is presented showing the selected color along with its color neighbors. The "distance" of the color neighbors can be adjusted so that nearer or further color choices can be made. Generally, the color neighbors are too distant if the target color is closer to the selected color than to the neighbor colors. When this occurs, the target color cannot be further narrowed down to a better match. By closing the distance of the color neighbors, the variation in color between the neighbors and the selected color will be reduced. This presents more choices to the user of colors that are closer to the target color.

The user will make successive choices for the best color match with each presentation of the color and its neighbors, generally decreasing the neighbor distance with each iteration. Eventually, the user will converge on the area of color space that contains the target color. When the selected color matches the target, the process is complete.

The concept of presenting color neighbors in a "natural" color space is key to the success of the invention. The color neighbors are calculated based on the colorants of the particular printer being used, but are presented to the user according to their human-natural organization by hue, lightness and saturation. This is quite different from how prior art color imaging devices organize color, which is usually by their prime colorants (red, green and blue, or cyan, magenta and yellow). Searching for a color by variations in colorants requires a knowledge, or "feel" for how the colors will be generated by the printer. By presenting color choices organized by hue, lightness and saturation, the present invention enables efficient and successful color searches to be made by laypersons unfamiliar with color technology. Among the inventive features are:

1. The presentation of "color neighbors" in hue, lightness and saturation in order to efficiently search for a target color.
2. Making color selections from the actual printed sample patches but indicating them through the computer representation of those patches.
3. Controlling the nearness of the color neighbors through the use of a "color spacing" control.
4. Re-computing a new set of color neighbors based on a previously selected closest color and iterating the search process.
5. Computing the neighbor colors in a way that allows the full exploration of the four-dimensional CMYK space while the user interacts with the 3D hue-lightness-saturation (HLS) space.
6. Calculating color neighbors near the edge of the printer's color space; i.e., substituting colorant levels in order to generate the perceptual neighbors.
7. Recording the color search state information on the sample patch print in order to recreate that exact color neighbor set at a different session.
8. Encoding Red-Green-Blue (RGB) color in a way that allows full and natural representation of a printer's Cyan-Magenta-Yellow-Black (CMYK) color space. The use of a "T" parameter allows a unique mapping between CMYK space and RGBT space.
9. Using a "legend" in the user interface to indicate the relative directions in color space of color neighbor choices.
10. Using an "active" legend to allow the user to specify color choices based on the color information in the legend.

Figure 1:
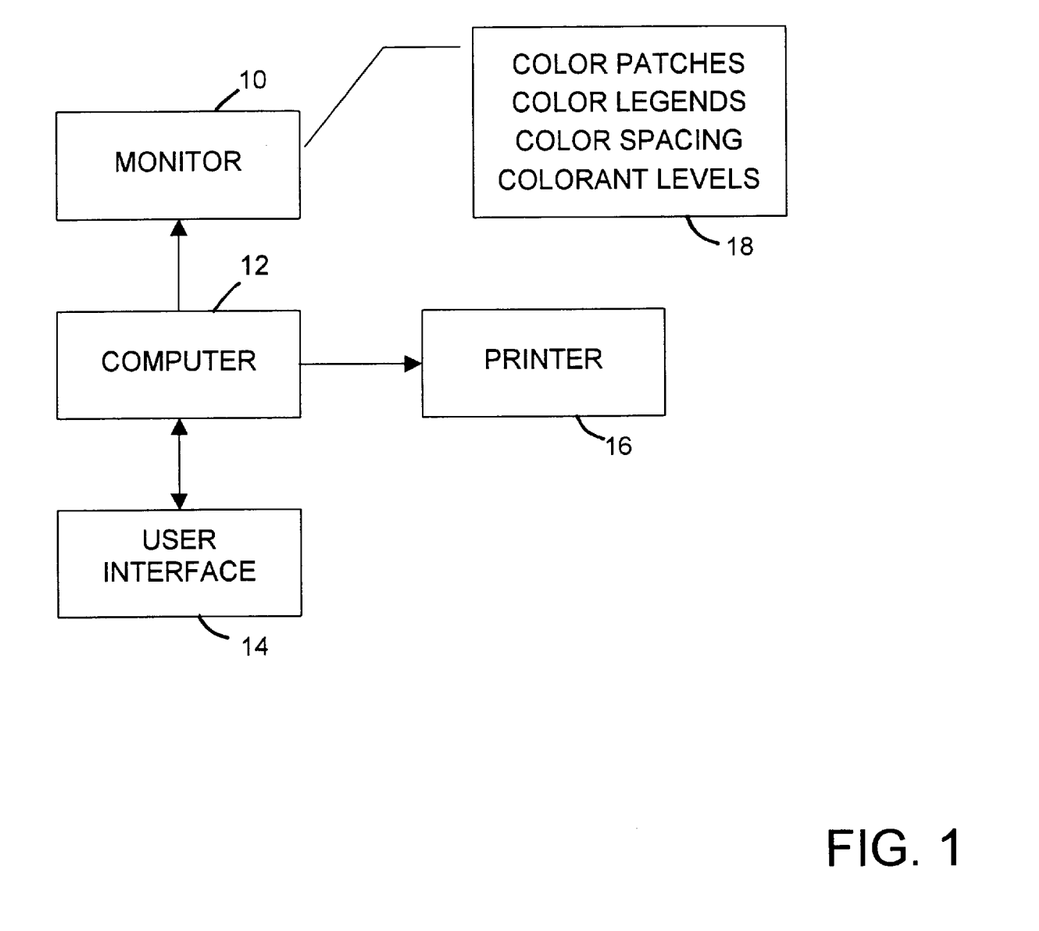
FIG. 1 is a block diagram of a computer system implementing the present invention.

FIG. 1 is a block diagram of a system for efficiently locating the colorant levels (e.g., CMYK) needed by a printer 16 to match a target color. The system comprises a user interface 14, operating on a computer 12, that presents candidate colors to the user via a monitor 10 and accepts the user's responses via the user interface. The user interface can include, for example, a color search dialog that is displayed on the monitor 10, and a keyboard, mouse, and/or voice recognition system or the like to enable the user to select features using the color search dialog. As indicated at 18, the color search dialog includes various color patches, color legends, color spacing controls and colorant level indicia which are displayed on the monitor 10, as described in greater detail below in connection with FIG. 2. An algorithm runs on the computer to prepare sets of candidate colors based on the user selections. The printer 16 prints a page containing the candidate colors from which the user selects the best match to the target color.

Figure 2:
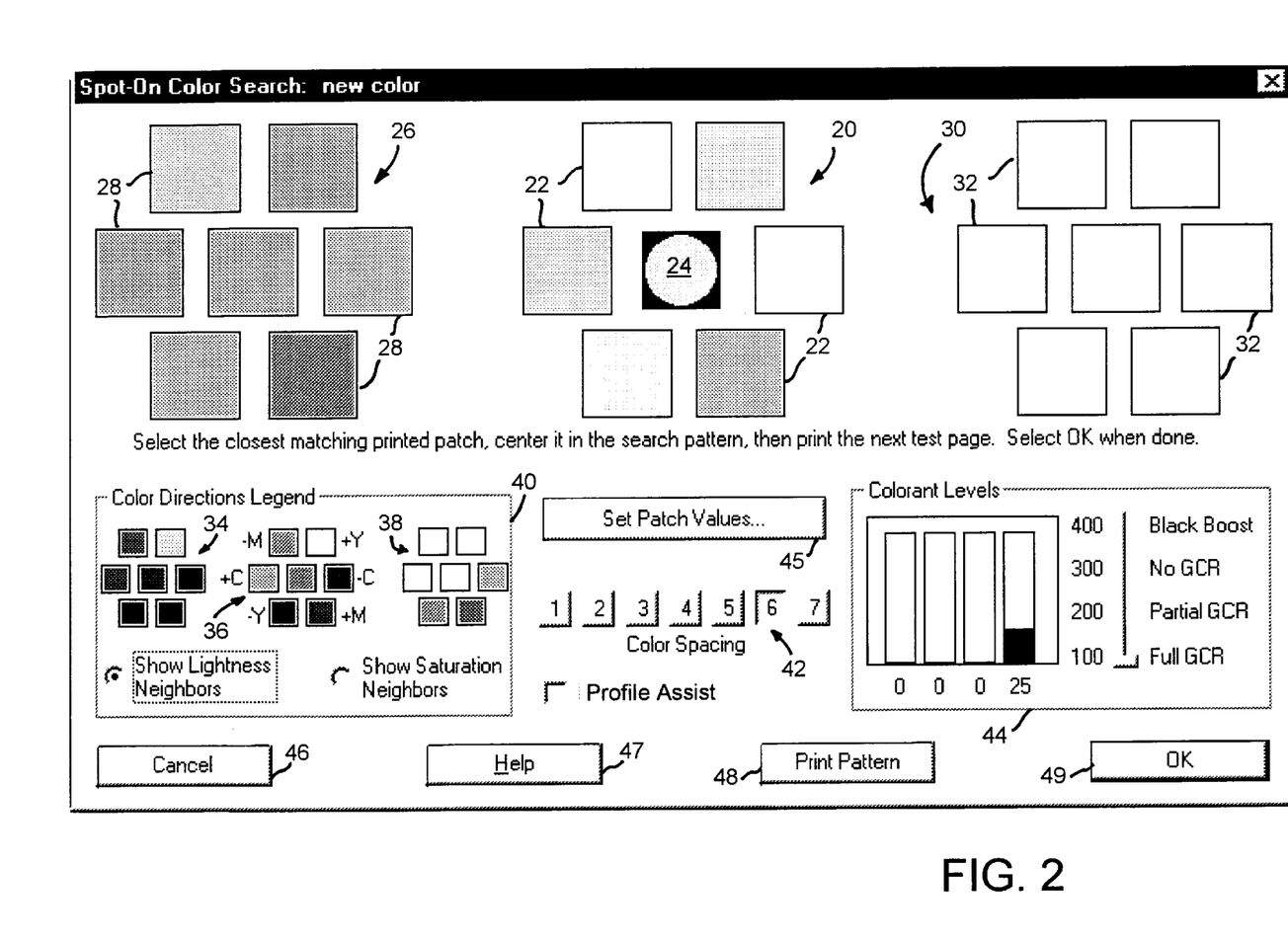
FIG. 2 is a drawing of an interactive computer screen showing one possible implementation of a user interface in accordance with the invention.

Referring to FIG. 2, the basic process starts from an initial guess (or instrument reading) of the target color, which is displayed as a center spot 24 of a candidate color set 20. A page is printed containing samples of the initial color of center spot 24 (the current color) and its color neighbors. The color neighbors are arranged by hue (patches 22) and either lightness or saturation (patches 28 and 32). The patches 22 in set 20 of color neighbors are all slightly different, but related, colors. Similarly, the patches 28 in set 26 and the patches 32 in set 30 are all slightly different, but related, colors. The sets 26 and 30 are related to the center candidate hue color set 20 by saturation or lightness, depending on the selection made in color directions legend 40 (i.e., "show lightness neighbors" or "show saturation neighbors").

Although only three sets 20, 26 and 30 of candidate color patches are shown in FIG. 2, it should be appreciated that fewer or more such sets can be provided. Moreover, the sets do not have to be limited to seven patches as illustrated; more or fewer patches can be provided in the sets, and each set can have a different number of patches if desired.

The user identifies from the printed page which of the color samples most closely matches the target color. This choice is entered to computer 12 via the user interface and becomes the new current color. A new set of color neighbors is then calculated by the computer based on the color generation algorithm. The neighbor "distance" can be adjusted by the user, e.g., via color spacing buttons 42 provided on a video display. In particular, the "distance" (color spacing) can be made smaller as the user selected printed color gets closer to the target. A new page of samples is then printed, and the process repeats. Within a few iterations, a printer-generated color can usually be found to match the target color.

A preferred embodiment of the user interface as shown in FIG. 2 contains several elements and controls that are important for the success of the process. These are now described in detail.

Color Neighbor Patches

A main feature of the color search dialog comprises the color neighbor patches 22, 28 and 32. These are organized in three groups or "candidate color sets" 20, 26 and 30 as mentioned above. The center 24 of the center group 20 is the initial starting color. The six color patches 22 around it are the color's hue neighbors, and represent variations of hue from the starting color.

The groups to the left and right of the central group (candidate color sets 26 and 30, respectively) are lightness neighbors or saturation neighbors, depending on a radio button choice within color directions legend 40. The left group 26 represents the same colors as in the center group 20, but darker. The color patches in the right group 30 are the same colors as in group 20, but lighter.

The purpose for showing the neighbor color patches is to see if any are a closer match to the target color than the current (center patch) color 24. A better candidate is selected, e.g., by clicking on it using a computer mouse.

Color Directions Legend

To the lower left in the color search dialog of FIG. 2 is the color directions legend 40 with color sets 34, 36 and 38. This is a miniature version of the main color neighbor patch display 20, 26, 30, but with highly exaggerated colors to help show the variations in the neighbor colors. As one approaches a target color match, the neighbors become quite close to each other, making the hue directions more difficult to discern. The color directions legend 40 helps identify the neighboring color space being navigated.

The legend 40 is "active." One can click on one of the mini-patches in it and the corresponding neighbor patch will become selected in the main color neighbor patch display. Also in the color directions legend is a radio button choice over which color groups to show: either lightness neighbors, or saturation neighbors. As each is selected, the legends 34, 36 and 38 change to show the corresponding lightness neighbors or saturation neighbors.

An alternative embodiment of the invention presents all of the color neighbors at once. In particular, five legends are provided in a cross pattern, instead of just the three legends shown in FIG. 2. The legends to the left and right of the center legend are, e.g., the darker and lighter color neighbors as described, and the legends above and below the center legend are, e.g., higher and lower saturation neighbors. In this presentation, the color neighbor radio button is not needed.

The "Set Patch Values" Button

Directly below the neighbor color patches is a large button 45. When a color patch is selected (other than the starting center patch) that represents a closer color to the target, the patch becomes highlighted and the button reads "Center this Color". Clicking on it will bring the selected color to the center of the pattern and then display its color neighbors.

Color Spacing

In the center of the search dialog are a series of numbered buttons 42 titled "color spacing." These buttons control the tightness of the color neighbor patches. A setting of 6 or 7 represents colors that are distant from the starting center color. As one finds colors that are closer to the target, the color spacing may be reduced to 5 and then 4 or less. This will show closer color choices as the search gets closer to the target color.

Profile Assist Checkbox

The "Profile Assist" checkbox causes the color neighbor patches on the screen to simulate how they will print out on paper. The simulation depends on color profiles that have been configured to represent the printer and the display. Normally, the Profile Assist checkbox is checked. This causes the displayed color patches in the dialog to simulate their printed versions, and allows the early coarse steps of the color search to proceed directly from choices made on the screen without requiring a page from the printer. The screen colors will not be an exact match, but they are much closer than when profiles are not used. When the screen color appears to match the target color, a page is printed and the color selection process is continued.

Colorant Levels

The Colorant Levels section 44 of the user interface screen display provides in a bar graph form the printer CMYK codes used to make the selected color. This enables a visual comparison to be made of the toner or ink levels used to generate the color.

Black Usage

Next to the bar graph in the Colorant Levels section is a slider bar that provides control of the black component in the CMYK printer codes. The scale represents the "T" parameter used to encode the printer colorant in RGBT form, as described in further detail hereinafter.

Print Pattern

The color search can be done using the screen simulation of the colors, but the goal of the search is to find the printer codes that make a printed color patch match a target. To do this, the color neighbor patches 22, 28, 32 are printed out on a test page. The printed patches are compared to the target color and the one that matches most closely is identified. The corresponding patch on the screen is selected to indicate this match.

Some additional information is printed on each test page. This information makes it possible to set up the exact conditions that made that set of color neighbor patches. If at some time in the future it is desired to recreate this page, the following information can be entered in the color search dialog:

center patch color numbers color spacing lightness or saturation neighbors select.

OK Button

Homing in on a target color using the color search patterns can be very efficient. After a little practice, most users can get to a very tight set of color neighbors (color distance 3 or less) after only a few iterations. The printed color patch that most closely matches the target color is identified and the corresponding patch on the screen is selected. When the printed patch makes a visual match, it is selected as the current color and the OK button 49 is clicked. This will communicate the CMYK printer codes that made that best match to the host program or system.

Cancel

A cancel button 46 is provided in a conventional manner to cancel an action taken through the user interface.

Help

A help button 47 is provided in a conventional manner to provide a help dialog in the event the user has a question as to how to operate the system.

Figure 3:
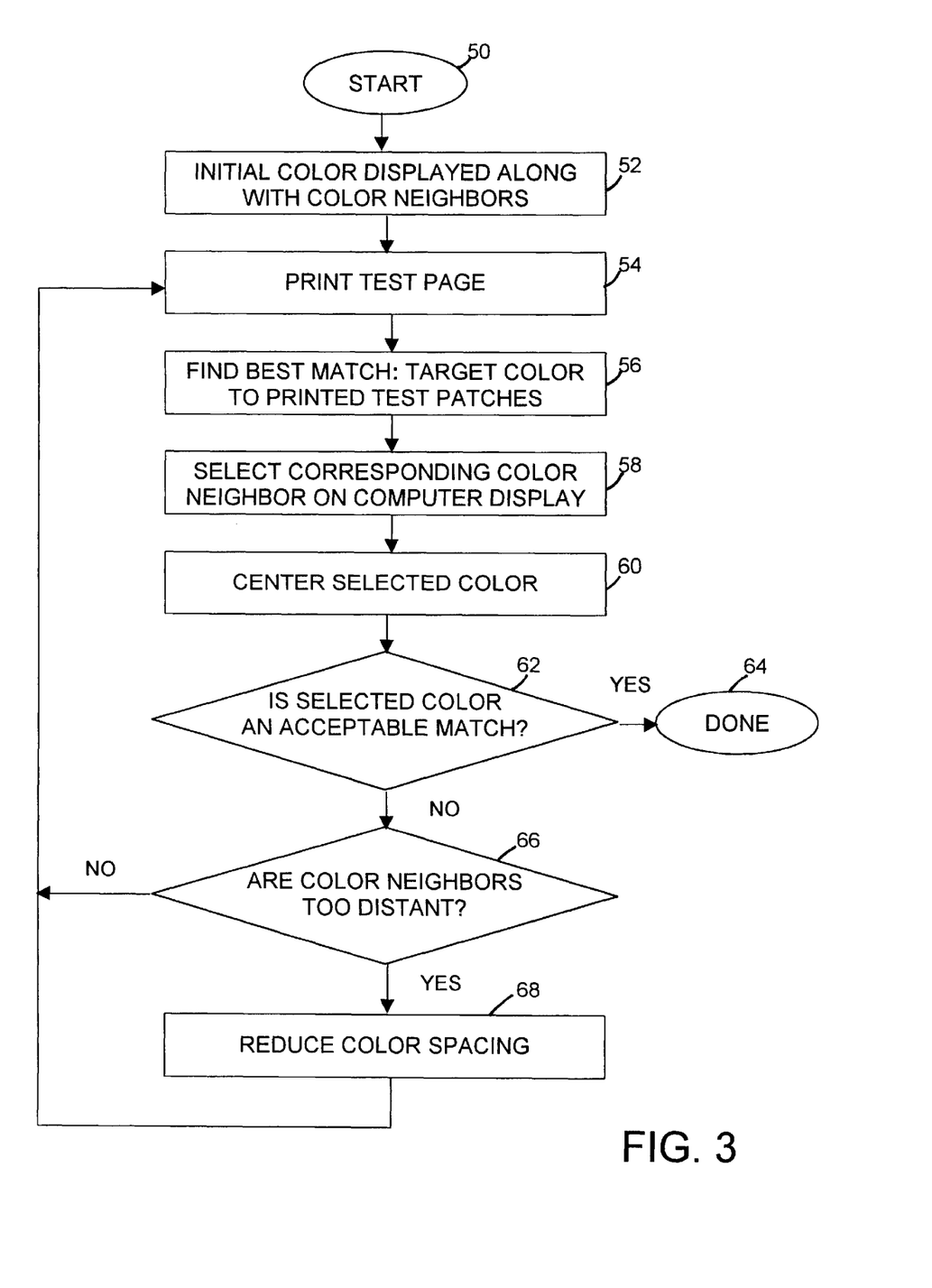
FIG. 3 is a flowchart showing the user interaction involved in matching a target color in accordance with the invention.

One implementation of the method of the invention is illustrated in flowchart form in FIG. 3. The method commences at box 50, and at box 52 the computer system displays an initial color along with neighboring colors. As indicated above, the initial color can comprise a guess made by the user, or can be determined based on a measurement taken, e.g., by a color densitometer. The initial color and neighboring colors can be presented to the user as shown in FIG. 2, or in any other suitable format.

Figure 5:
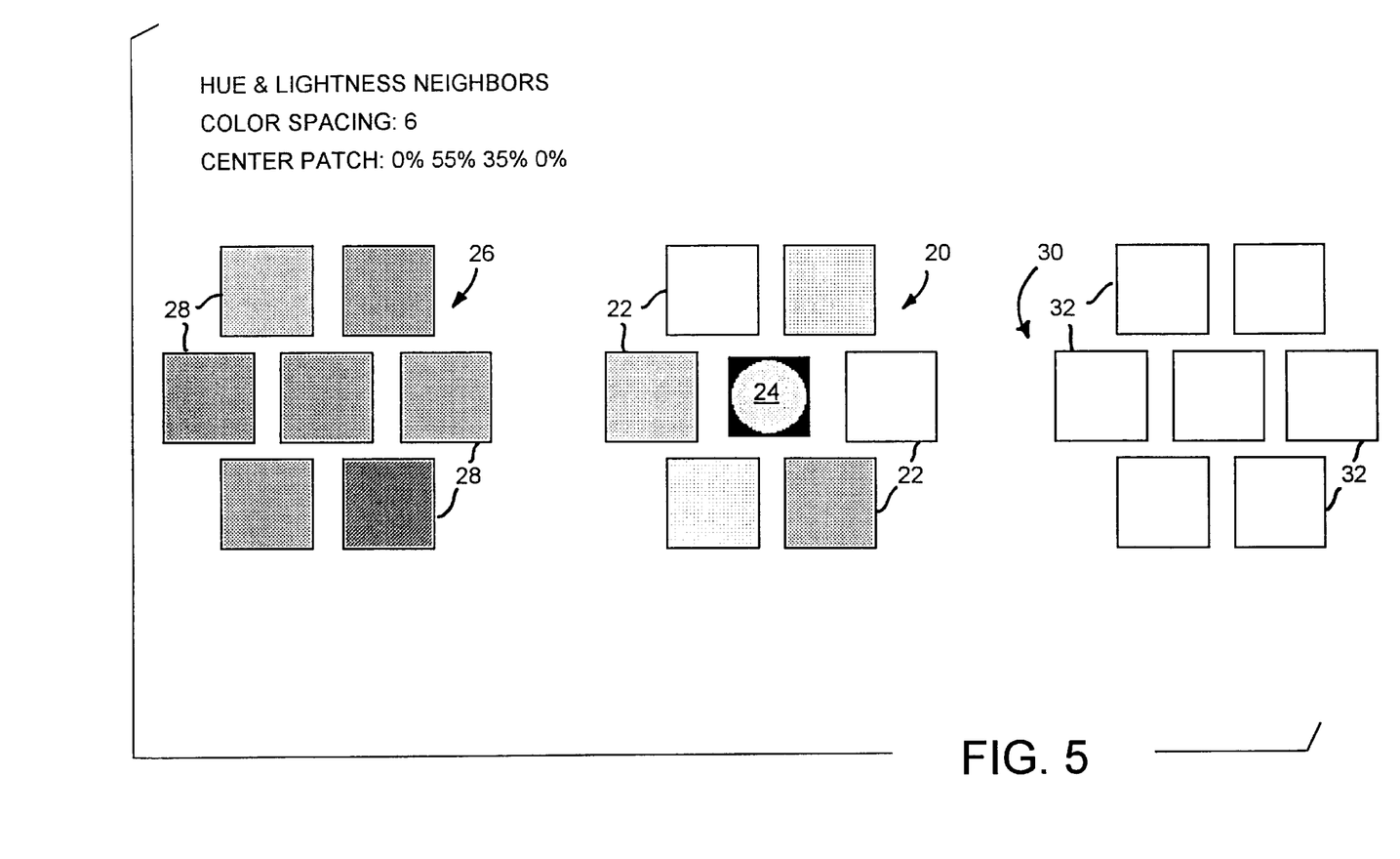
FIG. 5 depicts an example layout for a test page that is printed in accordance with the invention.

A test page containing the initial color and the color neighbors is then printed as indicated at box 54. The format of these colors on the test page can be the same as shown in FIG. 2; i.e., the three candidate color sets 20, 26 and 30 can be printed on the test page side-by-side just as they are seen in FIG. 2. Additional indicia can also be provided identifying the color spacing and center patch CMYK values (printer colorant levels). An example of the test page is shown in FIG. 5.

After the test page is printed, the user finds the best match between one of the printed test patches and the target color, as indicated at box 56. Generally, the best match will not be the center patch 24; it will be one of the color neighbors. After finding the best match, the corresponding color (generally one of the color neighbors) is selected on the computer display, as indicated at box 58. Then, as indicated at box 60, this corresponding color is centered in the candidate color set 20 on the computer display, so that it is in the position of center patch 24.

The user then decides (box 62) if the selected color (the new center patch 24) is an acceptable match to the target color. If so, the routine concludes as indicated at box 64. If not, the user determines if the color neighbors currently displayed on the computer screen are too distant (box 66). In other words, the user determines if the target color is closer to the selected color than to the neighbor colors. If so, the color spacing between the patches of the current candidate color sets is reduced, as indicated at box 68. Either way, the routine loops back to box 54, where a new test page is printed and the matching process is repeated.

It is noted that a new test page does not have to be printed with each iteration. Instead, the user can do some of the matching and color selection on the computer screen only, and print test pages when a selection has been fine-tuned to a point where the user believes that the printing of another test page is warranted.

Figure 4:
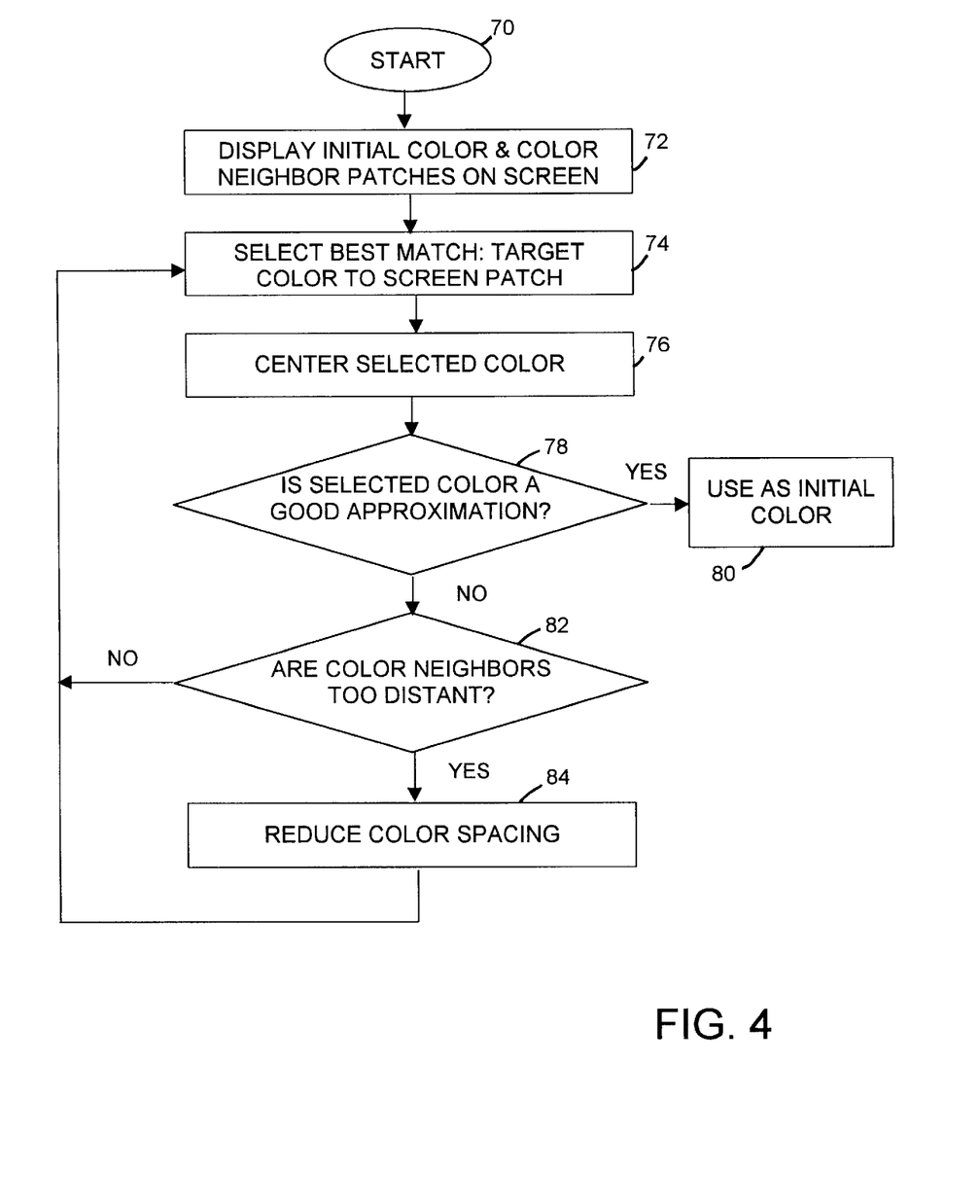
FIG. 4 is a flowchart showing a process for finding a close starting color using a computer screen display as a preview in accordance with the invention.

FIG. 4 illustrates a method for finding a good initial color match to be used as a starting point in the method of FIG. 3. The initial color match is made by using the computer screen display as a preview. The method commences at box 70, and as indicated at box 72, an initial color (e.g., a guess) is displayed on the computer monitor together with its color neighbor patches. The user selects the best match between the colors displayed and the target color, as indicated at box 74. The selected match is centered by the user (box 76) so that it resides at patch 24. The user then determines if this center color is a good enough approximation to start the method of FIG. 3. If so, it is used as the initial color in the method of FIG. 3, as indicated at box 80. Otherwise, the user determines at box 82 if the current color neighbors displayed on the computer screen are too distant to obtain a good match with the target. If so, the color spacing is reduced (box 84). The routine then loops back to box 74 and continues until an acceptable starting color is obtained.

The underlying algorithm that computes color neighbors and conducts the search will now be described. The task of the color search algorithm is to compute a set of color neighbors to a given color. The color neighbors are organized by hue, lightness, and saturation. This is perhaps easiest to conceptualize in the same manner that the color neighbors are presented in the color search dialog.

A starting color lies in a "hue-plane" of its hue neighbors. These are colors which have approximately the same lightness and saturation, but vary in hue with angle within the plane. Although hue varies smoothly, there are distinct directions that correspond to color names that humans observers universally can identify, such as "red", "yellow", "green" and "blue". These colors, or their complements, correspond also to the printer's colorants. When organized in this way, there are three coordinate axes identified within the hue plane: red-cyan, yellow-blue, and green-magenta. The color neighbors in the hue plane are found by examining the color space at a given distance in positive and negative directions along each of these axes.

Figure 6:
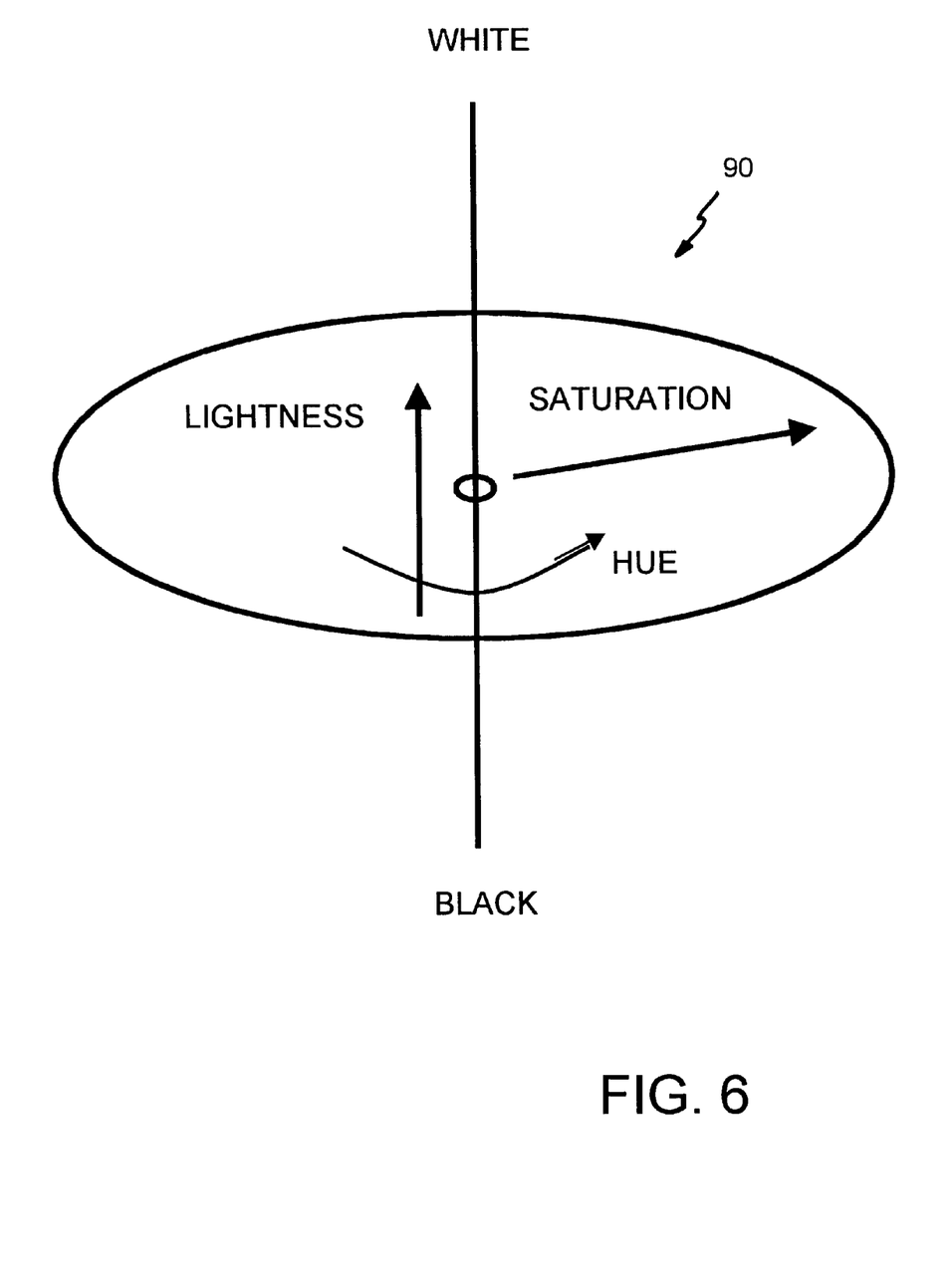
FIG. 6 is a schematic diagram of a color space showing the relationship of lightness, saturation and hue.

There are two other dimensions (axes) in the color space to find neighbor colors. The lightness neighbors are found by "translating" the hue neighbor plane to lighter and darker levels. The saturation neighbors are obtained by "moving" the hue plane neighbors to areas of the color space having the same hue, but higher and lower degrees of color saturation. A schematic representation 90 of these color neighbors is shown in FIG. 6. It should be noted that it is not necessary for all of the color neighbors to be unique. It is more important to preserve the color relationships within a group of color neighbors than it is to make all of the neighbor choices be unique.

The color neighbors are found according to rules or formulas that translate the neighbor spacing parameter into distances along various direction in color space. There are some complications however, because the neighbors are specified in a hue-lightness-saturation (HLS) three-dimensional (3D) space, and the printer's four colorants make it a four-dimensional (4D) space. It is important to be able to explore the entire 4D space of the printer while trying to match a color, but the presentation to the user must maintain the appearance of searching the more natural and familiar space of hue, lightness, and saturation. This is especially difficult when the color is near the boundary of the printer's color space. Special rules are used in this case to maintain the color relationships within the groups of color neighbors.

The rules that are used to generate neighbor colors for a CMYK printer are described as follows:

Establish the digital color distance, d, that represents a numeric increment in CMYK printer codes. The printer codes typically fall in the range 0:255. The distance d is related to the color spacing index, i, (1 to 7) that the user interacts with through a mathematical mapping such as:

$$d=2^{(i-1)}.$$

Given the center of the color neighborhood with coordinates C0, M0, Y0, K0, the immediate hue neighbors are the six sets computed by adding and subtracting d units according to:

| Direction | $C_0$ | $M_0$ | $Y_0$ | $K_0$ |
|---|---|---|---|---|
| red | −d | | | |
| yellow | | | +d | |
| green | | −d | | |
| cyan | +d | | | |
| blue | | | −d | |
| magenta | | +d | | |

There are two lightness neighbors to the center color found by:

| Direction | $C_0$ | $M_0$ | $Y_0$ | $K_0$ |
|---|---|---|---|---|
| lighter | | | | −d |
| darker | | | | +d |

The hue neighbors of these lighter and darker neighbors follow the same rules as above.

There are two saturation neighbors to the center color. These are obtained by identifying the strongest component (s) in the center color and adding and subtracting d units for that component. The strongest components are found by comparing each component, c, m, or y, to their average. In some cases two components will be greater than the average. Both are used to add and subtract the distance amount d to obtain the two saturation neighbors.

The hue neighbors of the less and greater saturation neighbors follows the same previous rules, but now using these saturation neighbors as the center of the neighborhood.

When the calculation of a color results in a coordinate that exceeds its allowable range (0:255), it must be modified in some way to be a valid set of device codes. The modification can be to simply clip the values to the limits of the code range, but this does not provide a very natural feeling to the operator who is searching this portion of the color space. An improvement is to clip the coordinate that runs overrange, and then modify the other coordinates in a way that provides a similar perception to the color step the user expects. For example, if a step toward cyan causes the cyan component to exceed 255, the cyan level is set to 255, black is increased, and the magenta and yellow components are decreased. This generates a neighbor which causes a perception of a relative step toward cyan by adding a neutral (black) and subtracting the non-cyan components of that neutral. The color will be darker, but still preserve the sense of color direction by the user. An example of calculating color neighbors and applying the clipping rules is shown in the appended software listing for GetSearchPatchCmyk.

When the color neighbors are obtained in a printer's CMYK space, it is helpful to translate these to RGB space to provide an approximation of the color on the RGB display of the user interface. The translation can be accomplished using device color profiles that represent the color space of the printer and the display. This has become an established procedure in color management systems, and is well known to those skilled in the art. If a color management system is not present, or if profiles are not available, it is still important to provide a visual cue regarding the behavior and organization of the color neighbors. To accomplish this, the present invention provides a new and novel intermediate color space referred to herein as "RGBT."

RGBT is like the familiar RGB used in additive color systems, but includes a fourth parameter, T, which loosely represents the "total ink level" that would be used in a four-color CMYK system. A unique mapping exists between CMYK and RGBT which allows for a reasonable and natural display of representative RGB colors.

The RGB portion of an RGBT vector can be used directly on an RGB display to represent the color. The T component is used to specify how that RGB is converted to a unique CMYK (out of a continuum of possible CMYK equivalents). The rules for doing this are:

1. Identify the smallest and largest components of c, m, y, and call them cmyMin and cmyMax.
2. Calculate an initial set of rgb as follows:

$r'=100\%-c$     2a.

$g'=100\%-m$     2b.

$b'=100\%-y$     2c.

3a. If k+cmyMax is greater than the maximum possible k (100%):
   the color is in a "black boost" region; set beta to k, the fraction of black ink used (0 to 1.0), and calculate the quantity t=300+100*beta. Modify the rgb values:

$r=(1-beta)*r'$ $g=(1-beta)*g'$ $b=(1-beta)*b'$

3b. If k+cmyMax is less than 100%:
   t=300.0−200*k/(k+cmyMin). Modify the rgb values:

$r=r'-k$ $g=g'-k$ $b=b'-k$

A sample program segment GetPatchRgbt that implements this mapping is appended.

The procedure to convert back to cmyk, given an rgbt, is:
If t>300:

$beta=(t-300)/100$, (fraction, 0 to 1)

$c=100\%-r/(1-beta)$ $m=100\%-g/(1-beta)$ $y=100\%-b/(1-beta)$ $k=beta*100\%$

If t<300:

$k=(100\%-Max[r,g,b])*(300-t)/(500-t)$ $c=100\%-r-k$ $m=100\%-g-k$ $y=100\%-b-k$

It should now be appreciated that the present invention provides a quick and accurate method for determining colorant levels required by a printer to match a target color. A user reviews related candidate color sets on a computer monitor, prints test patches for comparison of the actual printer output with the desired target color, and zeroes in on an acceptable match in an iterative manner.

The color neighbors in the candidate color sets are calculated based on the colorants of the particular printer being used, but are presented to the user according to their human-natural organization by hue, lightness and saturation. The unique presentation of color choices organized by hue, lightness and saturation allows efficient and successful color searches to be made by laypersons unfamiliar with color technology.

Although the invention has been described in connection with various preferred embodiments, it should be appreciated that numerous adaptations and modifications may be made thereto without departing from the scope of the invention as set forth in the claims.

---

SAMPLE PROGRAM CODE

```
// GetSearchPatchCmyk
//
// The function that computes the cmyk values for
// the neighbors in the color search pattern. This
// function is written so that external access can
// be made without reference to the other member
// variables in this class.
//
COLORRER GetSearchPatchCmyk (int     patchNumber,
    int c, int m, int y, int k,       // center patch values
    int colorStep,                    // 2^n where 0<=n< =6
    int lightnessSearch)              // 0=saturation, else
                                      // lightness
// The search pattern is three clusters of patches.
// In each cluster are the six hue neighbors.
// The clusters are variations in either lightness
// or saturation depending on the state of the radio
// button. Patches are identified by a 2 digit ID.
// The first digit is the cluster number 0,1,2 dark,
// normal, light. The second digit is the hue angle
// (index) 0..6 from none (0) red (1), yellow
// (2) ...blue (5), magenta (6).
//
    {
```

-continued

SAMPLE PROGRAM CODE

```
COLORREF  cmykSolor;
switch  (patchNumber % 10)
{
    case 0:
        break;
    case 01:
        c -= colorStep;
        if (c < 0)
        {
            c = 0;
            if ((m < 255) && (y < 255))
                k -= colorStep;
            m += colorStep;
            y += colorStep;
            if (y >255) y = 255;
            if (m >255) m = 255;
            if (k < 0) k = 0;
        }
        break;
    case 02:
        y += colorstep;
        if (y >255)
        {
            y = 255;
            if ((c >0) && (m >0))
                k += colorStep;
            c -= colorStep;
            m -= colorStep;
            if (c < 0) c = 0;
            if (m < 0) m = 0;
            if (k >255) k = 255;
        }
        break;
    case 03:
        m -= colorStep;
        if (m < 0)
        {
            m = 0;
            if ( (c < 255) && (y < 255))
                k -= colorStep;
            c += colorStep;
            y += colorStep;
            if (c >255) c = 255;
            if (y >255) y = 255;
            if (k < 0) k = 0;
        }
        break;
    case 04:
        c += colorStep;
        if (c >255)
        {
            c = 255;
            if ((y >0) && (m >0))
                k += colorStep;
            y -= colorStep;
            m -= colorStep;
            if (y < 0) y = 0;
            if (m < 0) m = 0;
            if (k > 255) k = 255;
        }
        break;
    case 05:
        y -= colorStep;
        if (y < 0)
        {
            y = 0;
            if ((m < 255) && (c < 255))
                k -= colorStep;
            m += colorStep;
            c += colorStep;
            if (c > 255) c = 255;
            if (m > 255) m = 255;
            if (k < 0) k = 0;
        }
        break;
    case 06:
        m += colorStep;
```

-continued

SAMPLE PROGRAM CODE

```
        if (m > 255)
        {
            in = 255;
            if ((c > 0) && (y > 0))
                k += colorStep;
            c -= colorStep;
            y -= colorStep;
            if (c < 0) c = 0;
            if (y < 0) y = 0;
            if (k > 255) k = 255;
        }
        break;
}
if (lightnessSearch)
{
    // clusters show lightness variations
    if (patchNumber >= 20)
    {
        k -= colorStep;
        if (k < 0)
        {
            // adjust cmy components
            c += k;
            m += k;
            y += k;
            if (c < 0) c = 0;
            if (m < 0) m = 0;
            if (y < 0) y = 0;
            k = 0;
        }
    }
    else if (patchNumber < 10)
    {
        k += colorStep;
        if (k > 255)
        {
            // adjust cmy
            c += (k-255);
            m += (k-255);
            y += (k-255);
            if (c > 255) c = 255;
            if (m > 255) m = 255;
            if (y > 255) y = 255;
            k = 255;
        }
    }
}
else
{
    // the clusters show variations in
    // saturation instead of lightness
    double avgCmy;
    avgCmy = (c + m + y) / 3.0;
    if (patchNumber >= 20)
    {
        // raise the saturation level
        if (c > avgCmy) c += colorStep;
        if (m > avgCmy) m += colorStep;
        if (y > avgCmy) y += colorStep;
        if (c < avgCmy) c -= colorStep;
        if (m < avgCmy) m -= colorStep;
        if (y < avgCmy) y -= colorStep;
        if (c < 0) c = 0;
        if (m < 0) m = 0;
        if (y < 0) y = 0;
        if (c > 255) c = 255;
        if (m > 255) m = 255;
        if (y > 255) y = 255;
    }
    else if (patchNumber < 10)
    {
        if (c > avgCmy)
        {
            c -= colorStep;
            if (c < avgCmy) c = (int)avgCmy;
        }
        else
```

SAMPLE PROGRAM CODE

```
            {
            c += colorStep;
            if (c > avgCmy) c = (int)avgCmy;
            }
        if (m > avgCmy)
            {
            m -= colorStep;
            if (m < avgCmy) m = (int)avgCmy;
            }
        else
            {
            m += colorStep;
            if (m > avgCmy) m = (int)avgCmy;
            }
        if (y > avgCmy)
            {
            y -= colorStep;
            if (y < avgCmy) y = (int)avgCmy;
            }
        else
            {
            y += colorStep;
            if (y > avgCmy) y = (int)avgCmy;
            }
        }
    }
    cmykColor = c | (m<<8) | (y<<16) | (k<<24);
    return (cmykColor);
    }
// GetPatchRGB
//
// return the RGB values associated with the
// patch.
//
COLORREF:GetPatchRgbt (int patchNumber)
{
    // return the color of the patch ID in 00bbggrr
    // form
    int         r, g, b, t;
    COLORREF color;
    // we are searching in cmyk space, convert to
    // rgb
    int         c, m, y, k;
    int         cmyMax, cmyMin;
    color = GetPatchCmyk (patchNumber);
    c = color & 0x000000FF;
    m = (color & 0x0000FF00) >> 8;
    y = (color & 0x00FF0000) >> 16;
    k = (color & 0xFF000000) >> 24;
    cmyMax = c;
    if (m > cmyMax) cmyMax = m;
    if (y > cmyMax) cmyMax = y;
    r = 255 - c;
    g = 255 - m;
    b = 255 - y;
    if (k + cmyMax > 255)
        {
        // we are using excess black, "black
        // boost" region
        double beta = k/255.0;
        t = (int) (300.0 + 100.0 * beta);
        r = (int) ((1.0 - beta) * r);
        g = (int) ((1.0 - beta) * g);
        b = (int) ((1.0 - beta) * b);
        }
    else
        {
        // we are in the "normal" 100 to 300 total
        // ink usage range
        cmyMin = c;
        if (m < cmyMin) cmyMin = m;
        if (y < cmyMin) cmyMin = y;
        t = (int) (300.0 - 200.0 * k/(k+cmyMin));
        r -= k;
        g -= k;
        b -= k;
        }
```

SAMPLE PROGRAM CODE

```
    if (t < = 300)   // encode t to fit in 0:255 range
        t = t - 100;
    else
        t = 200 + (t-300)/2;
    color = (t << 24) + (b << 16) + (g << 8) + r;
    return(color);
    }
```

What is claimed is:

1. A method for determining colorant levels required by a printer to match a target color, comprising the steps of:

(a) generating a set of candidate colors on a computer;

(b) printing said set of candidate colors on said printer;

(c) generating a further set of candidate colors on said computer in response to user input indicative of a correlation between a color in a most recent printed set of candidate colors and said target color;

(d) printing said further set of candidate colors on said printer;

(e) repeating steps (c) and (d), if necessary, until a selected color in the most recent printed set of candidate colors acceptably matches said target color; and (f) recording information indicative of the colorant levels required by said printer to print the selected color.

2. A method in accordance with claim 1, wherein said sets of candidate colors comprise a center color spot surrounded by a plurality of similarly colored spots.

3. A method in accordance with claim 2, comprising the further step of providing a particular color for said center color spot in response to user input.

4. A method in accordance with claim 3, wherein the colored spot from the most recent printed set of candidate colors that a user determines best matches the target color is provided as the next center spot.

5. A method in accordance with claim 1 wherein said candidate colors in step (a) are generated from an initial guess for the target color selected from a palette of colors presented to a user by the computer.

6. A method in accordance with claim 1 wherein said candidate colors in step (a) are generated from an instrument reading of the target color.

7. A method in accordance with claim 1 wherein said user input in step (c) includes an option for adjusting a color spacing between individual colors in the further set of candidate colors.

8. A method in accordance with claim 1 comprising the further steps of:

providing a user with color spacing and colorant level information pertaining to the sets of candidate colors; and enabling a user to subsequently enter the printed color spacing and colorant level information during step (a) for use in generating an initial set of candidate colors.

9. A method in accordance with claim 1 wherein said sets of candidate colors each comprise a plurality of color neighbors related by at least one of hue, lightness and saturation, and are presented to a user on a display associated with said computer.

10. A method in accordance with claim 9 wherein said color neighbors are related by hue, lightness and saturation.

11. A method in accordance with claim 10 wherein said user input in step (c) includes an option for adjusting a color spacing between said color neighbors.

12. A method in accordance with claim 1 wherein said candidate colors are displayed on a computer monitor associated with said computer using an RGB color space and printed on said printer using a CMYK color space, said method comprising the further steps of:

mapping said CMYK color space to said RGB color space; and encoding the RGB colors for display on said monitor in accordance with said mapping.

13. A method in accordance with claim 12 wherein said mapping includes an additional parameter T associated with said RGB colors and indicative of a total ink level of said CMYK colors to facilitate a unique mapping from CMYK to RGB.

14. A method in accordance with claim 12 comprising the further step of:

providing a plurality of candidate color sets at one time on said monitor.

15. A method in accordance with claim 14, wherein the different sets of said plurality are related by one of lightness and saturation.

16. A method in accordance with claim 15 comprising the further step of allowing a user to choose between said lightness and saturation relationships.

17. A method in accordance with claim 1 wherein said candidate colors are displayed on a computer monitor associated with said computer.

18. A method in accordance with claim 1 wherein said candidate colors are displayed on a computer monitor associated with said computer, said method comprising the further steps of:

providing a plurality of candidate color sets at one time on said monitor, the different sets of said plurality being related by at least one of lightness and saturation;

allowing a user to select a color patch from a displayed candidate color set;

computing a new plurality of candidate color sets based on the user selection; and displaying the new plurality of candidate color sets on said monitor.

19. A method in accordance with claim 18 comprising the further step of:

allowing said user to iteratively select color patches from successively computed and displayed candidate color sets prior to printing a desired set of candidate colors on said printer.

20. A method in accordance with claim 19 wherein said sets of candidate colors each comprise a plurality of color neighbors related by at least one of hue, lightness and saturation.

21. A method in accordance with claim 20 comprising the further step of allowing the user to adjust a color spacing between said color neighbors.

* * * * *